United States Patent [19]

Lal

[11] Patent Number: 5,396,445
[45] Date of Patent: Mar. 7, 1995

[54] BINARY CARRY-SELECT ADDER

[75] Inventor: Shiang J. Lal, Taipei, Taiwan, Prov. of China

[73] Assignee: Industrial Technology Research Institute, Hsiuchu, Taiwan, Prov. of China

[21] Appl. No.: 52,713

[22] Filed: Apr. 26, 1993

[51] Int. Cl.[6] ............................................. G06F 7/50
[52] U.S. Cl. .................................................. 364/788
[58] Field of Search ............... 364/788, 787, 786, 785, 364/784

[56] References Cited

U.S. PATENT DOCUMENTS

| 3,316,393 | 4/1967 | Ruthazev | 364/788 |
| 3,553,446 | 1/1971 | Kvuy | 364/788 |
| 4,764,888 | 8/1988 | Holden et al. | 364/788 |

Primary Examiner—Roy N. Envall, Jr.
Assistant Examiner—Emmanuel Moise
Attorney, Agent, or Firm—Bo-In Lin

[57] ABSTRACT

The present invention comprises a binary select adder for adding two numbers of N binary bits, where $N=2^K+R$ and K is an integer whereas R is an integer remainder and $0 \leq R < (2^{K+1} - 2^K)$. The binary carry select adder comprises a plurality of full adder pairs for adding one bit of the two numbers wherein each of the pairs including a first adder for processing an initial sum and carry assuming a carry select of zero and a second adder for processing an initial sum and carry assuming a carry select of one. The binary carry select adder further includes a plurality of fourplex processing means each connected to the pair of full adders or another one of the fourplex processing means forming a plurality of intermediate stages for receiving four input data and generating a pair of appropriate intermediate 'carrys'. The binary carry select adder further includes a plurality of multiplex processing means receiving input from the pairs of full adders or the fourplex processing means, each of the multiplex processing means further receiving a carry from the multiplex processing means of one-less significant bit for generating a final sum output for each bit and a final carry output for the N-th bit. The inter-connected pairs of full adders, fourplex processing means and multiplex processing means forming $(K+1)$ adder cells wherein each cell processing $2^m$ bits (where $m=1,2,\ldots,K$) of the N bits for generating a sum output for each bit in the adder cell and a carry for input to next adder cell whereas the last adder cell processing last R bits of the N bits.

8 Claims, 17 Drawing Sheets

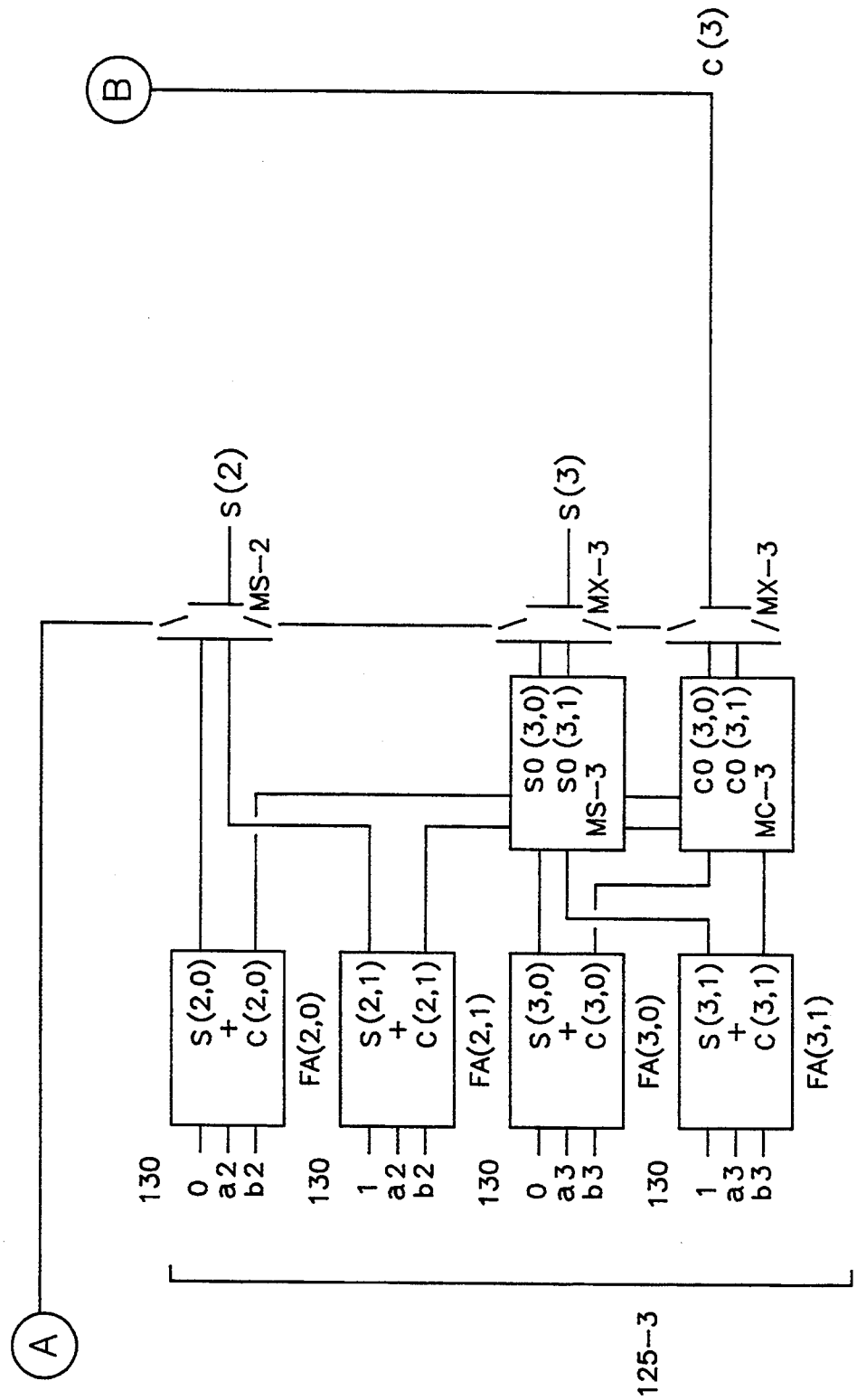
Figure 2 Continued (Prior Art)

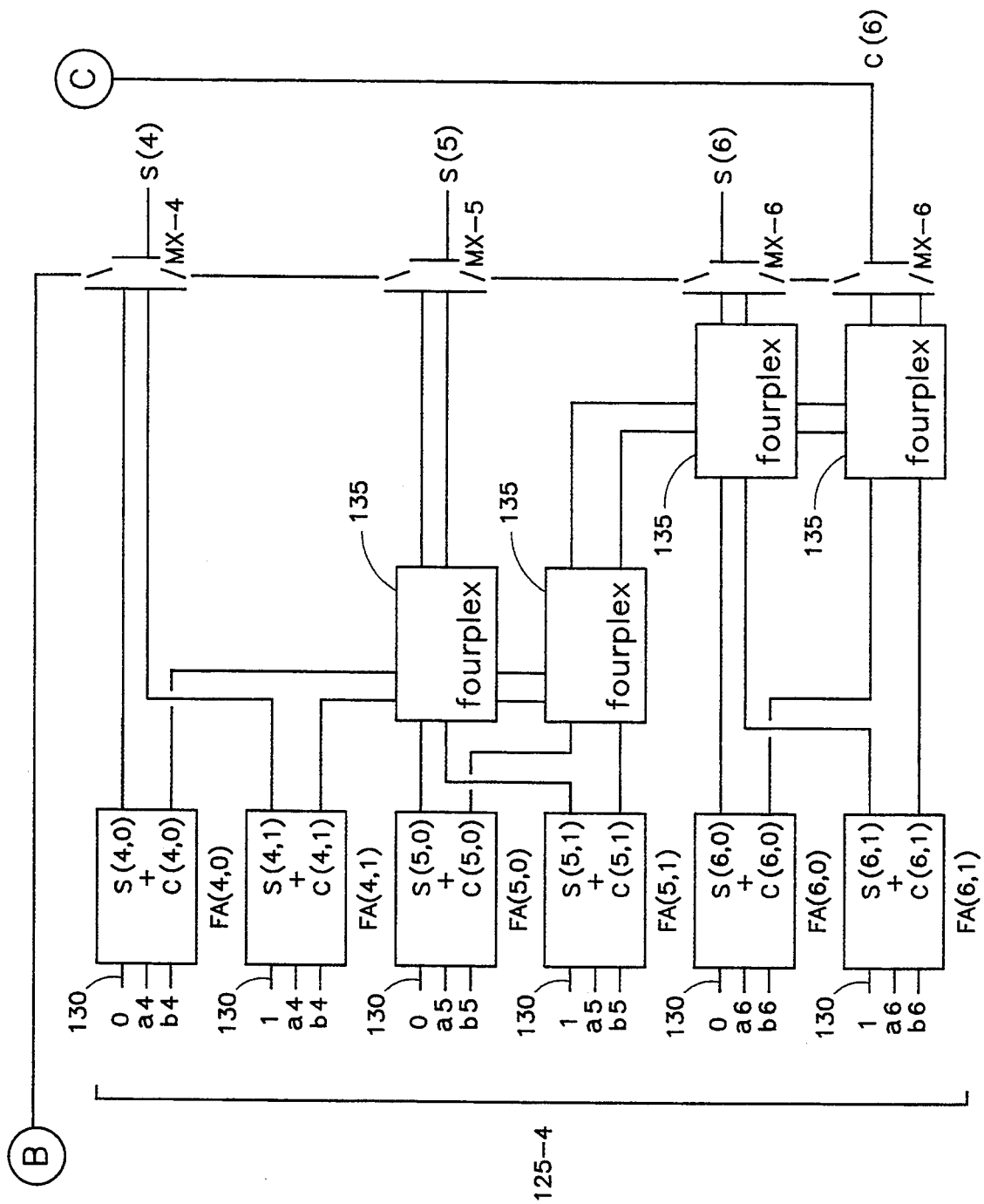
Figure 2 Continued (Prior Art)

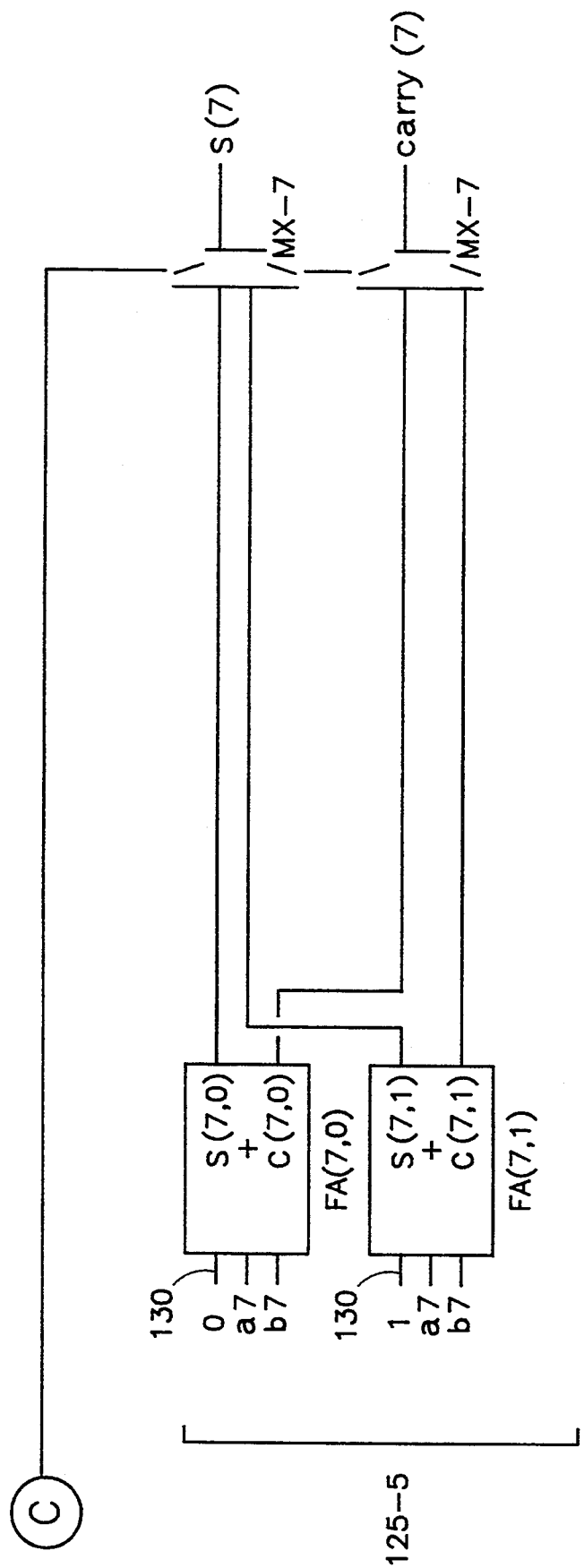
Figure 2 Continued (Prior Art)

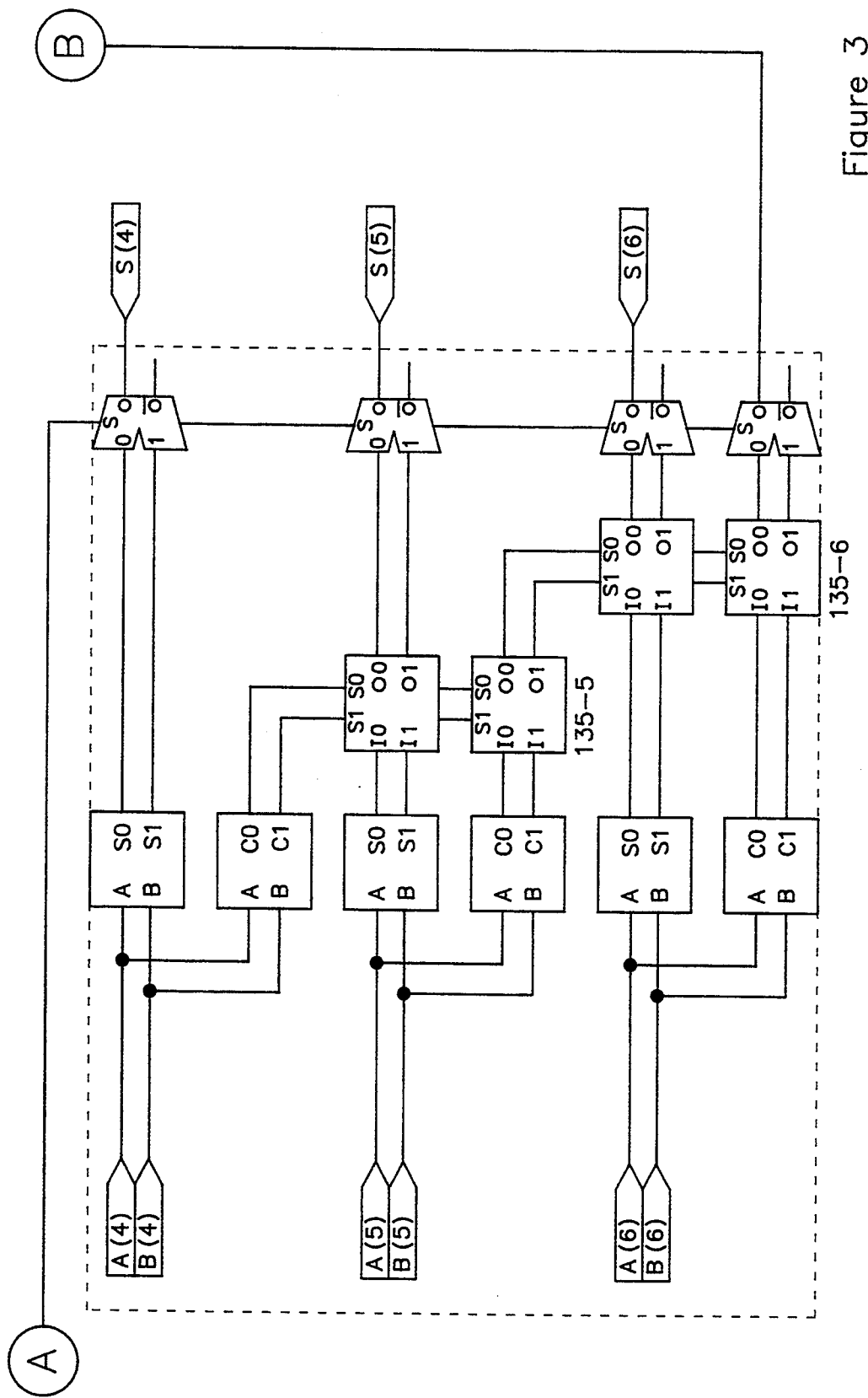
Figure 3 Continued (Prior Art)

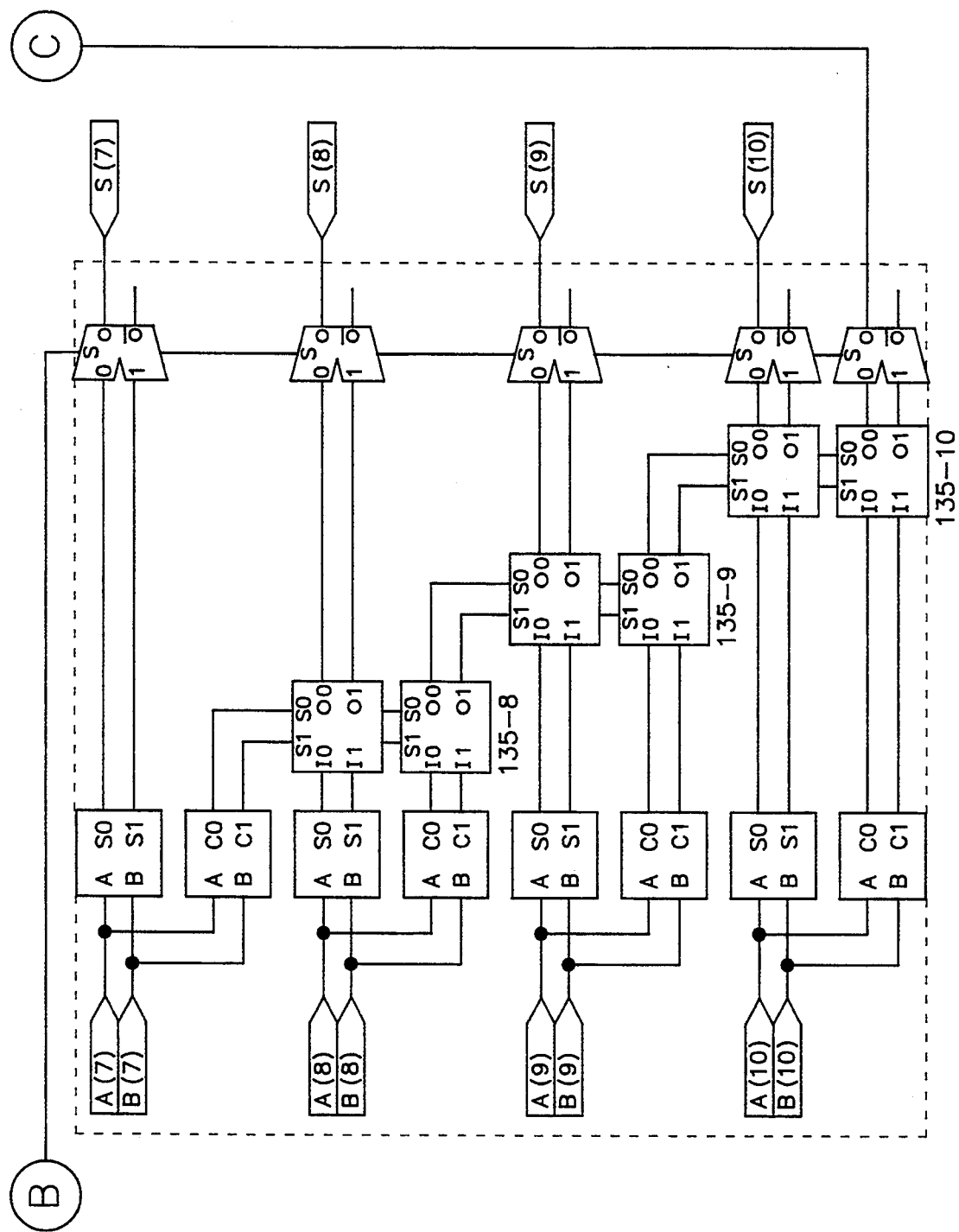
Figure 3 Continued (Prior Art)

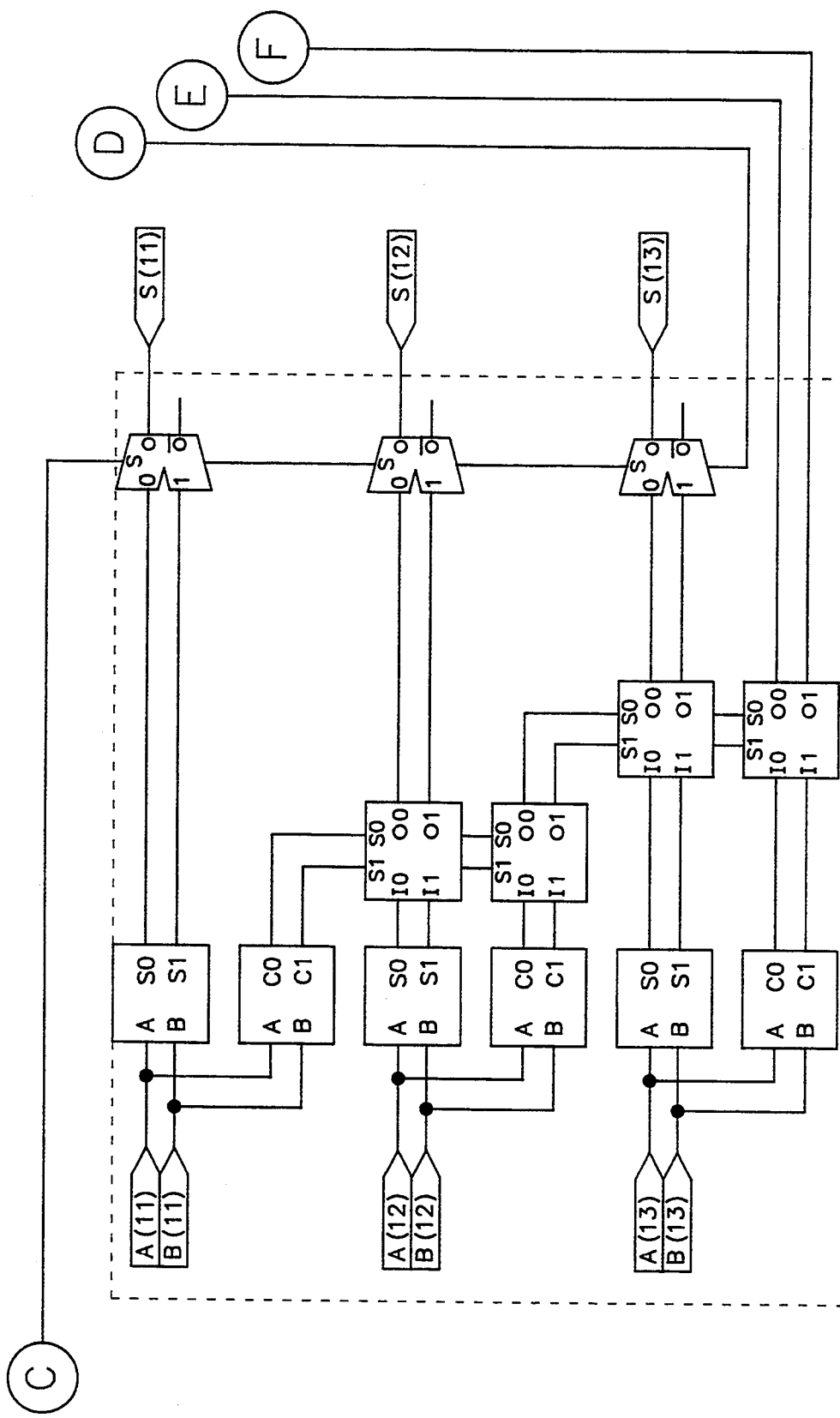
Figure 3 Continued (Prior Art)

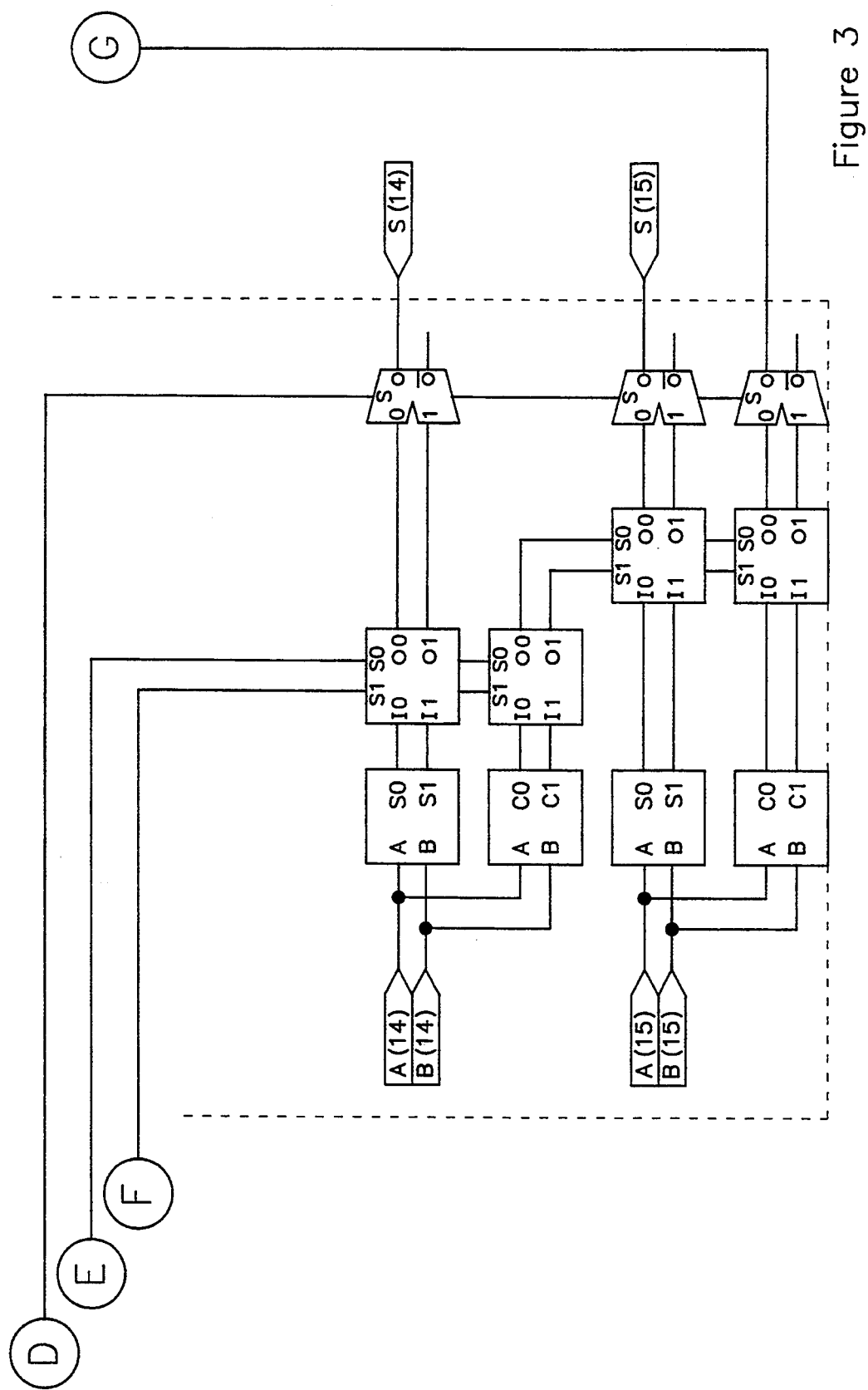
Figure 3 Continued (Prior Art)

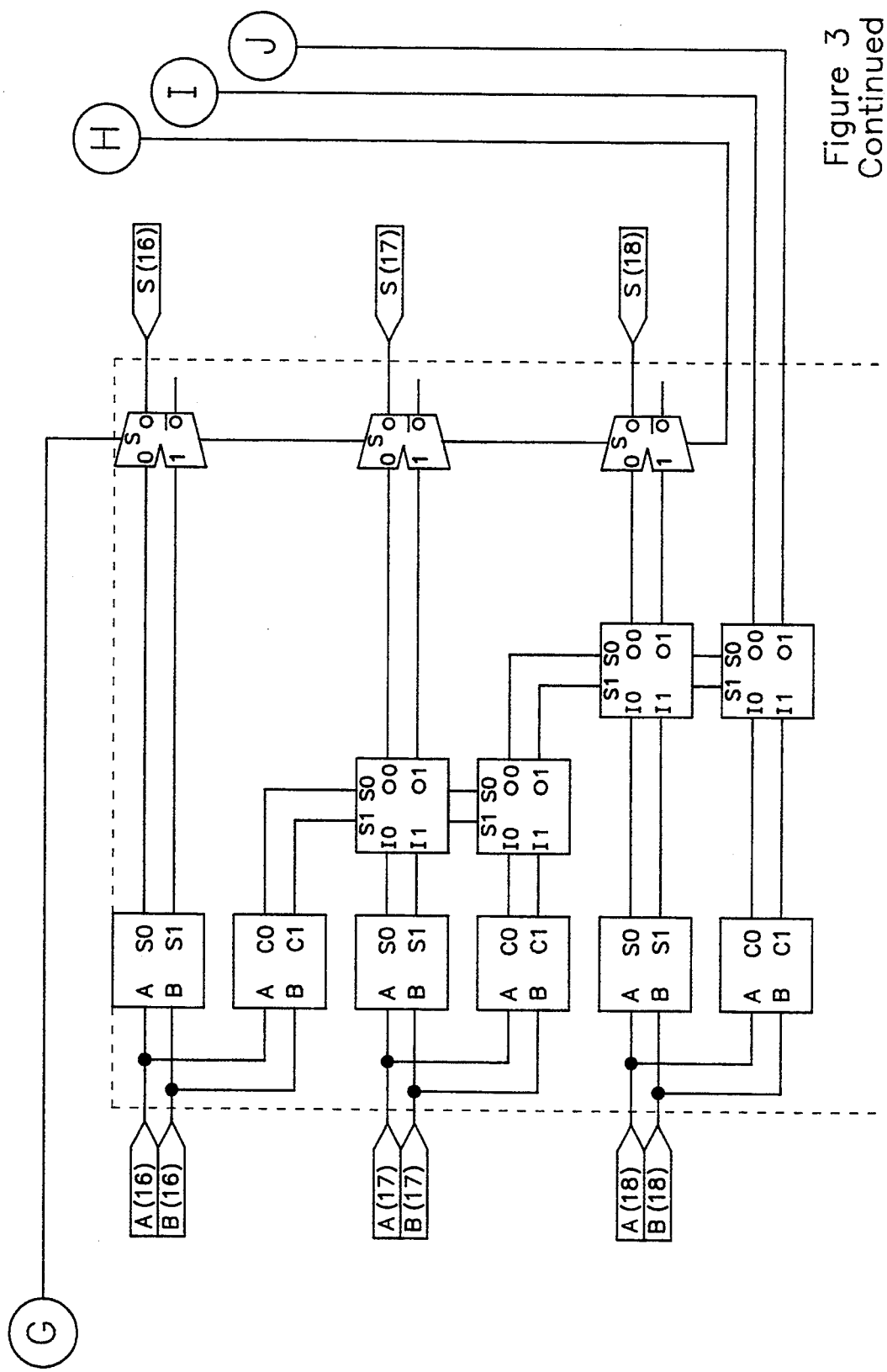
Figure 3 Continued (Prior Art)

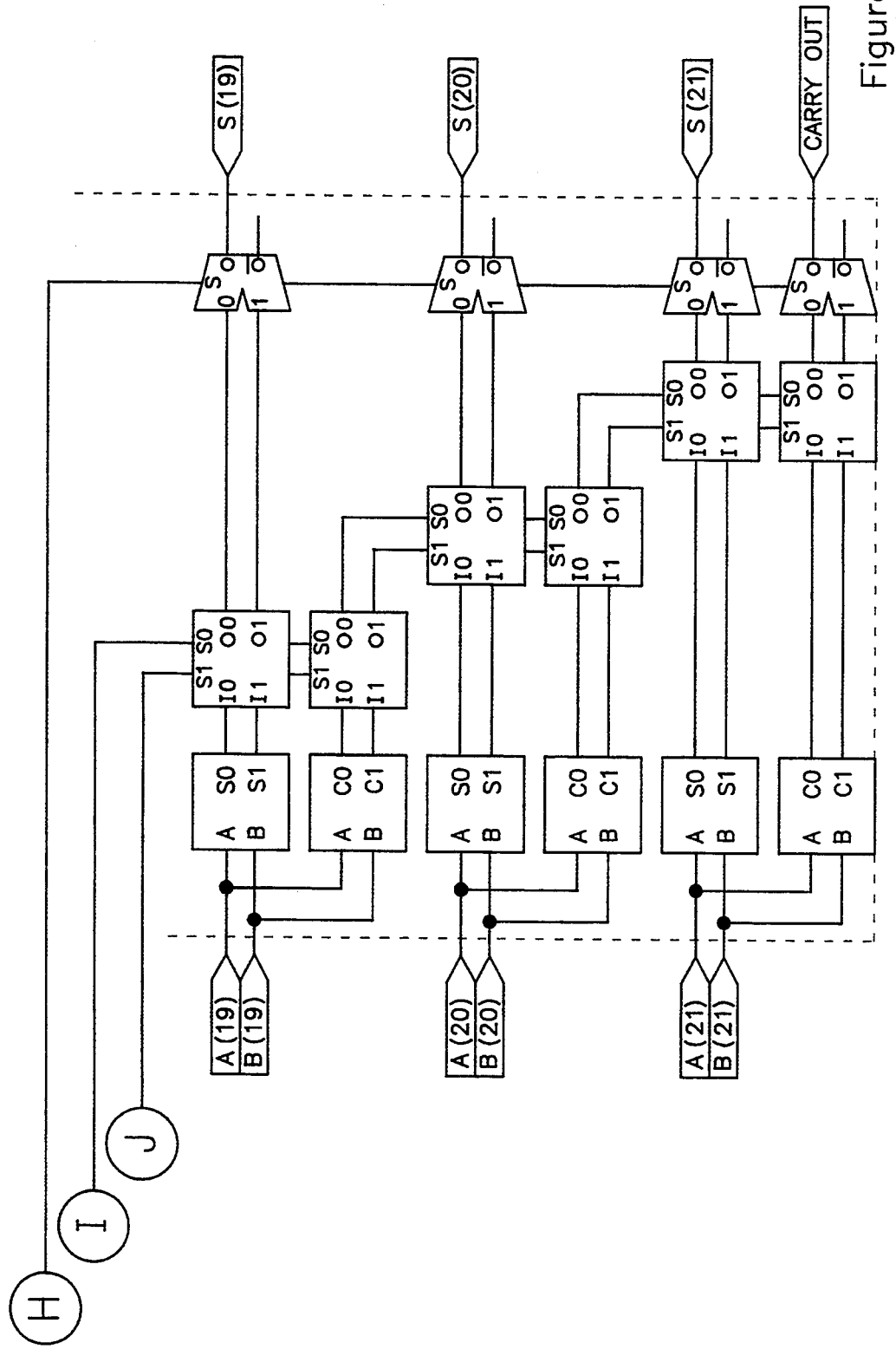
Figure 3 Continued (Prior Art)

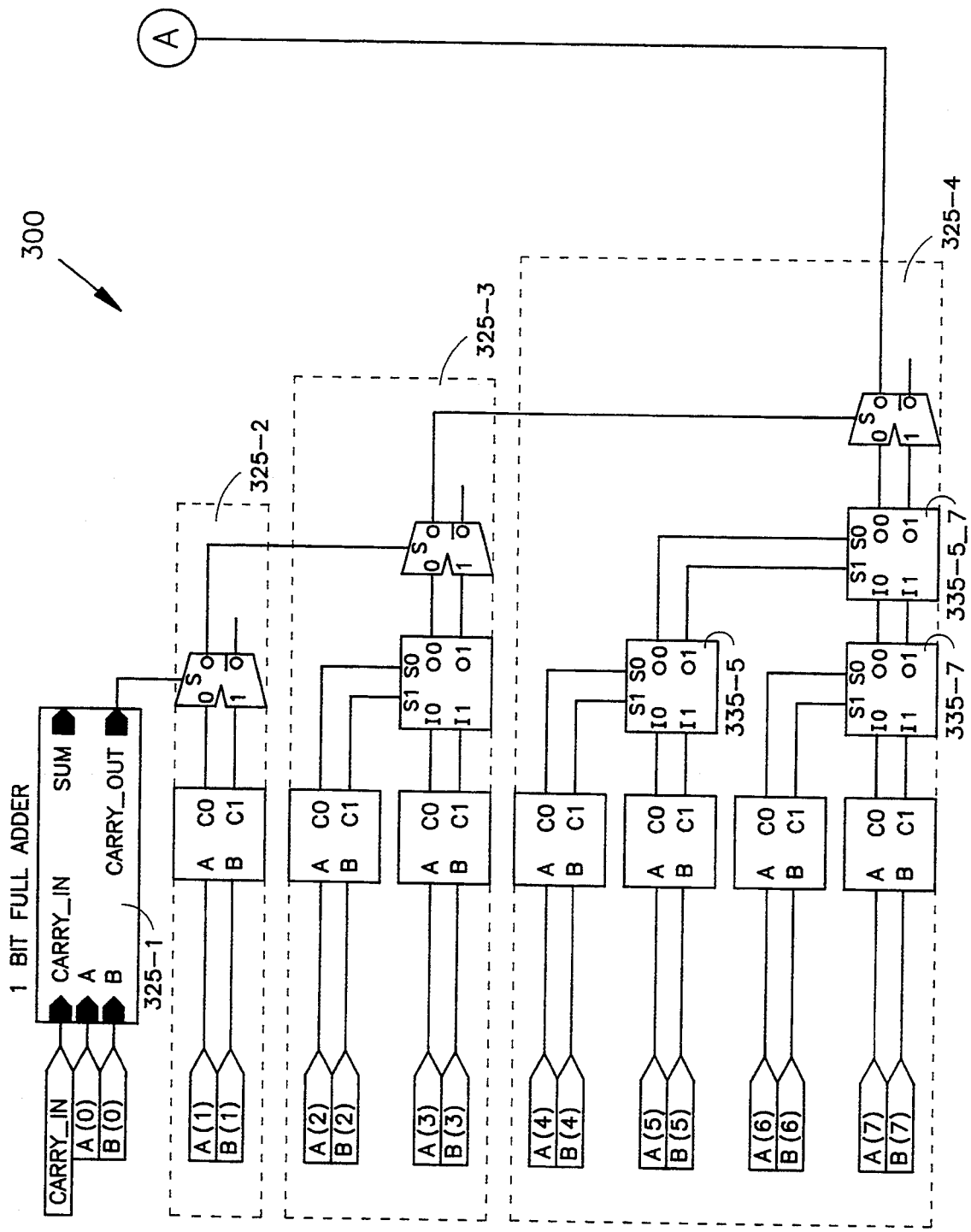

BINARY CARRY-SELECT ADDER

BACKGROUND OF THE INVENTION

1. Field of the Invention

This invention relates generally to the methods and circuit implementation for performing an arithmetic addition operation. More particularly, this invention relates to a binary carry-select algorithm and the circuit design for implementation on an integrated circuit (IC) chip to achieve a faster addition operation.

2. Description of the Prior Art

An operation of adding two numbers to obtain the arithmetic sum thereof is a most common task routinely performed by modern data processors under various circumstances for different applications. Various algorithm and IC circuits are implemented to carry out this addition operation. Recent trend in computation technology requires ever increased rate of processing speed, i.e., higher through-put. An algorithm which has a feature capable of substantially increasing the speed of addition operations can be applied to a broad spectrum of applications to significantly improve the performance of a wide variety of computations.

One type of circuit for carrying out the adding operation is the 'ripple-carry' circuit, wherein an adder is divided into many adder cells and each adder cell computes a sum and a carry for a bit or a bit group. After computing the sum and the carry in each adder cell, a carry output is serially transmitted from an adder cell for a least significant bit to an adder cell for a higher order bit. The time required for completing the computation of sum is essentially determined by the time for the carry signal to 'ripple' through from the adder cell for the least significant to the most significant order of bits of the two adding operands. Due to the ripple effect, the computation time is delayed.

Another type of adders are the 'carry-select' adders wherein two numbers each having many digits to be added are first divided into a plurality of corresponding digital groups. The adder for performing the summing operation is divided into adder cells each cell is to process a corresponding digital group. FIG. 1 shows such an adder cell 100. Each of the adder cells such as the adder cell 100 includes two double carry paths 102 and 104. Each carry path, 102 and 104, is used for an assumed carry signal 106 from the next less significant digital group which is either zero or one at the input side of the adder block. Among the carry paths 102 and 104 to be selected during the next data transmission is decided by employing a pair of carry-select multiplexers 108 (for sum) and 110 (for carry) using the block carry signal 106 of the preceding blocks. Two kinds of sums for each of the corresponding digital groups are thus processed first with the assumption that a 'carry' 106 from the next less significant digital group is either one or zero. These sums for each of these digital groups are processed in parallel and a selection is made sequentially for each of these groups from the less to the more significant digital group if the sum is to be the value based on the assumption wherein the carry is either zero or one.

A more complicate application of the basic concept as depicted in FIG. 1 is an adder used for adding two operands of greater number of bits (or bit groups) as sown in FIG. 2. An adder 120 for adding two numbers is divided into many adder cells 125-1, 125-2, 125-3, etc. Each adder cell 125-i where i=1,2, 3 ... , n processes a plurality of bits of two numbers, i.e., $a_0a_1a_2a_3...a_n$ and $b_0b_1b_2b_3...b_n$. Except the first adder 125-1 for adding the least significant bit a0 to b0, every other adder cell has at least two full adders (FA) 128 denoted as FA(i,0) for calculating a sum and carry assuming the input carry i.e., the carryin 130, is zero, and FA(i,1) for calculating a sum and carry assuming the carryin 130, is one and where i denotes that the full adder is for processing bit the i-th bit.

Starting from the adder cell 125-1 for adding two least significant bits $a_0$ and $b_0$, the first full adder FA(0) generates a sum S(0) and a carry C(0). The carry C(0) is then transmitted to next adder cell 125-2 wherein FA(1,1) generates a sum s(1,1) and a carry c(1,1) and FA(1,0) generates a sum s(1,0) and a carry c(1,0). A pair of multiplexers MS-1 and MC-1 are used to process the sum and the carry for adding $a_1$ and $b_1$. Depending on the value of C(0), MS-1 selects s(1,1) or s(1,0) as the sum S(1) and similarly, MC-1 selects c(1,1) or c(1,0) as the carry C(1) to be transmitted to next adder cell 125-3.

In the adder cell 125-3, the summing operations are performed for bit-2 and bit-3. Two pairs of full adder FA(2,1), FA(2,0) and FA(3,1), FA(3,0) are used to generate corresponding sums, i.e., s(2,1) s(2,0), s(3,1),and s(3,0),and 'carrys' c(2,1), c(2,0), c(3,1), and c(3,0). A sum multiplexer MS-3 and a carry multiplexer MC-3, which receive c(2,1) and c(2,0) as input, are then used to compute the sum S(3) and the carry C(3) for adder cell 125-3. MS-3 and MC-3 each has two output lines $S_o(3,1)$ and $S_o(3,0)$, and $C_o(3,1)$ and $C_o(3,0)$ respectively. Table 1 shows the selection of this pair of multiplexers.

TABLE 1

| | TRUTH TABLE FOR MS-3 AND MC-3 | | | | |
|---|---|---|---|---|---|
| c(2,1) | c(2,0) | $S_0(3,1)$ | $S_0(3,0)$ | $C_0(3,1)$ | $C_0(3,0)$ |
| 0 | 0 | S (3,0) | S (3,0) | C (3,0) | C (3,0) |
| 1 | 0 | S (3,1) | S (3,0) | C (3,1) | C (3,0) |
| 1 | 1 | S (3,1) | S (3,1) | C (3,1) | C (3,1) |

The output of MS-3 and MC-3 as represented by Table 1 can be derived from the fact that if c(2,1) and c(2,0) as computed by FA(2,1) and FA(2,0) respectively are both zero, then the sum and carry as computed by FA(3,0) are to be selected because now the carry is zero. Conversely, if c(2,1)=c(2,0)=1, then the sum and carry as computed by FA(3,1) are to be selected since the carry is one. However, if c(2,1) is one and c(2,0) is zero, then the carry and sum for the adder cell 125-3 is dependent upon the carry of the next less significant adder cell, i.e., C(1). A multiplexer MX-3 receives C(1) and $S_o(3,1)$, $S_o(3,0)$, $C_o(3,1)$, and $C_o(3,0)$ as input to process a sum S(3) and a carry C(3).

The combination of MS-3 and MC-3 constitute a fourplex processing means 135. The fourplex processing means 135 receives two carry-over input from a pair of full adders 128 for processing the next less significant bit and which also receives four output from a pair of full adders 128 for processing the current bit. The fourplex processing means generates the sum and the carry in accordance with Table 1.

In order to increase the through-put of the adder system 120, the next adder cell 125-4 makes use of the fourplex processing means 135 to process bits-4 to bit-6. The processing of bits-4 and bit-5 is identical to the process as described above for bit-2 and bit-3. Two carry output as generated by the fourplex processing means 135-5 for bit-5 are now inputted to the fourplex processing means 135-6 for bit-6 to generate a sum and carry for bit-6. In addition to the four input, the fourplex processing means 135-6 also receives a carry C(3) from last adder cell 125-3 to compute a sum S(6) and a carry C(6) to be carried over to next adder cell.

By the use of the same method and structure, next adder cell 125-5 processes bit-7 to bit-10. In order to more clearly show the structure of the adder 120 in the prior art, a simplified illustration is shown in FIG. 3. Only the structural portion for performing the operations of the 'carry' for each pair of the full adder 128 is now shown as adder 128' and the fourplex processing means 135 is shown as one processing unit 135'. By referring to FIG. 3, it can be determined that the number of bits processed is increased by one from one adder cell to the next. It is also very clear for the structure of adder 120 the time required to process additional bits increase almost in a linear fashion because the need to wait for the receipt of the carry from the next less significant adder cell. For ease of reference, on the right hand side of each adder cell a number is also used in FIG. 3 to show the time cycles delay required for completion of the process of that adder cell. As the number of bits increased, the delay time is increased according to:

$$T\alpha[\tfrac{1}{2}+(2N-7/4)^{\tfrac{1}{2}}] \qquad (1)$$

For the operation of adding two numbers with greater number of bits, the time cycles required for the adder 120 to complete the computation can become a bottle neck to a high speed processor when adding of two numbers of longer bit streams is performed frequently.

Therefore, a need still exits in the art to reduce the number of the time cycle delay in a carry select adder whereby the processing speed of the adder can be further improved which can be implemented to improve the performance level of different processes in a broad range of applications.

SUMMARY OF THE PRESENT INVENTION

It is therefore an object of the present invention to provide a binary select adder which reduces number of adder cells thus reduces the delay caused by the requirement of waiting for the carry input from the less significant adder cells.

Another object of the present invention is to provide a binary select adder which allows more parallel processing of selecting the appropriate sum and carry among many adder cells such that the processing speed is increased.

Another object of the present invention is to provide a binary select adder which is capable of processing the addition of numbers with greater number of bits without requiring unreasonable long processing time.

Briefly, in a preferred embodiment, the present invention comprises a binary carry select adder for adding two numbers of N binary bits. where $N=2^K+R$ and K is an integer whereas R is an integer remainder and $0 \leq R < (2^{K+1}-2^K)$. The binary carry select adder comprises a plurality of full adder pairs for adding one bit of the two numbers wherein each of the pairs including a first adder for processing an initial sum and carry assuming a carry select of zero and a second adder for processing an initial sum and carry assuming a carry select of one. The binary carry select adder further includes a plurality of fourplex processing means each connected to the pair of full adders or another one of the fourplex processing means forming a plurality of intermediate stages for receiving four input data and generating a pair of appropriate intermediate 'carrys'. The binary carry select adder further includes a plurality of multiplex processing means receiving input from the pairs of full adders or the fourplex processing means, each of the multiplex processing means further receiving a carry from the multiplex processing means of one-less significant bit for generating a final sum output for each bit and a final carry output for the N-th bit. The inter-connected pairs of full adders, fourplex processing means and multiplex processing means forming (K+1) adder cells wherein each cell processing $2^m$ bits (where m=1,2,..,K) of the N bits for generating a sum output for each bit in the adder cell and a carry for input to next adder cell whereas the last adder cell processing last R bits of the N bits.

An advantage of the present invention is that it provides a binary select adder which reduces number of the adder cells thus reduces the delay caused by the requirement of waiting for the carry input from the less significant adder cells.

Another advantage of the present invention is that it provides a binary select adder which allows more parallel processing of selecting the appropriate sum and carry among many adder cells such that the processing speed is increased.

It is another advantage of the present invention that it provides a binary carry select adder which is capable of processing the addition of numbers with greater number of bits without requiring unreasonable long processing time.

These and other objects and the advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
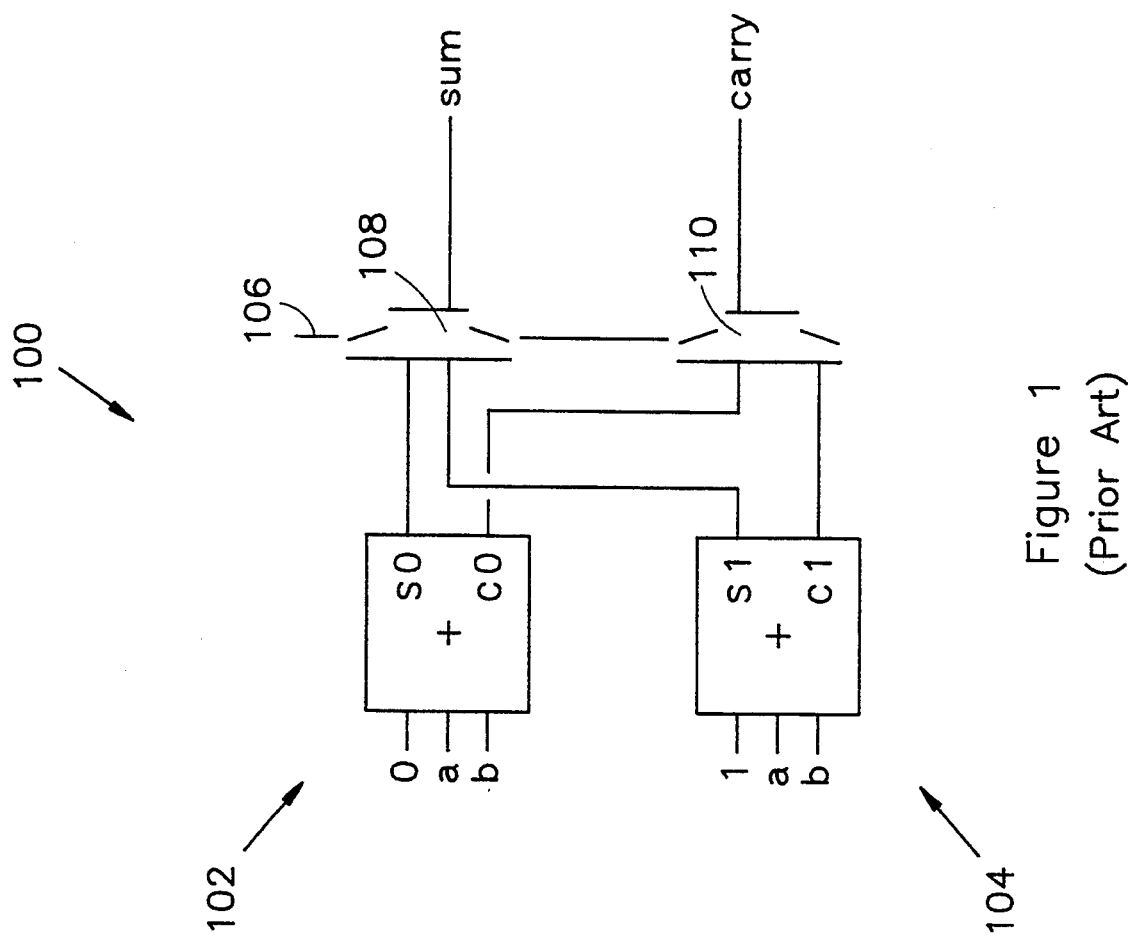
FIG. 1 shows a schematic block diagram showing the operation of the basic concept of a carry select adder.
Figure 2:
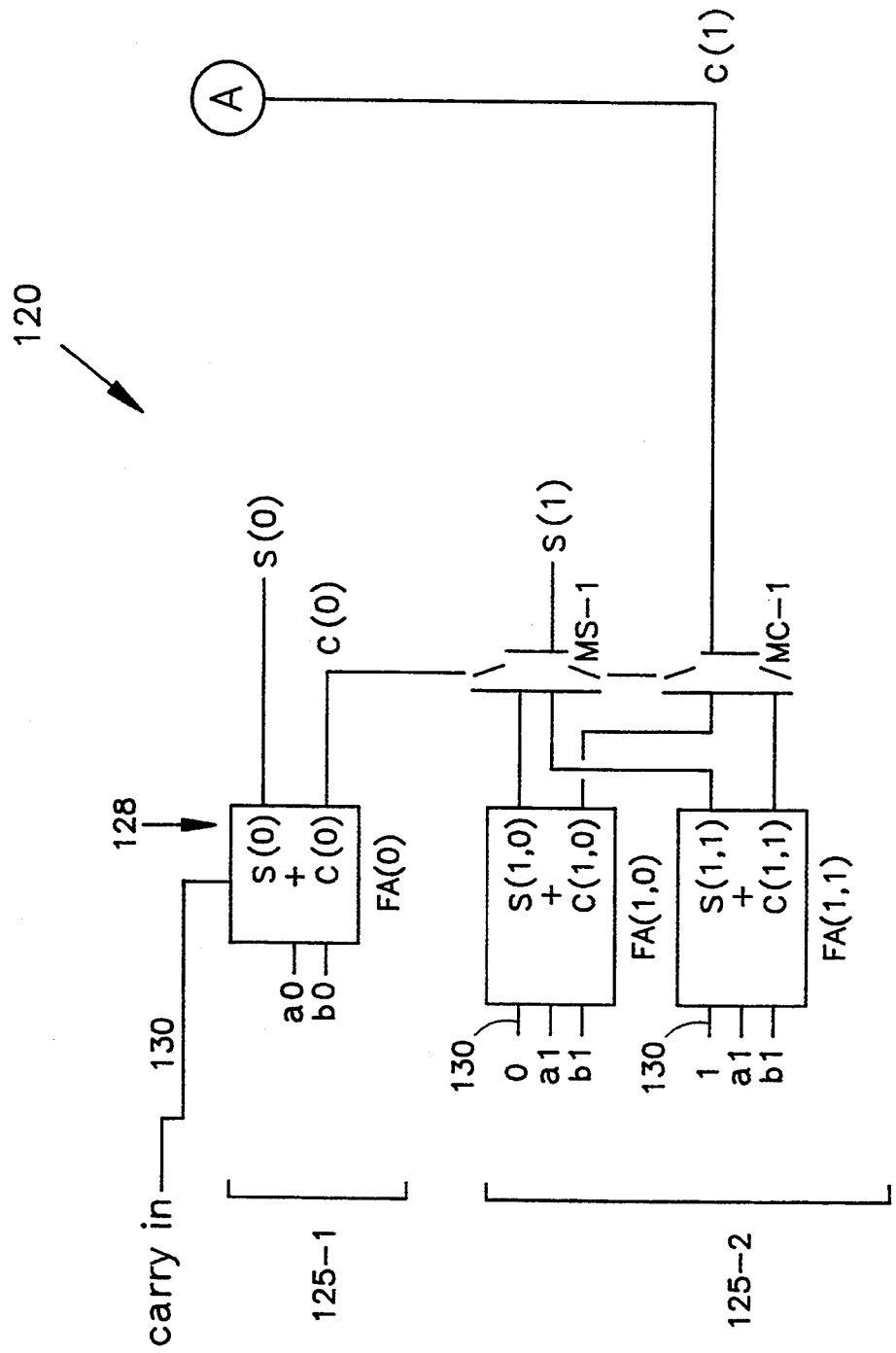
FIG. 2 shows a carry select adder for processing greater number of bits which comprises many adder cells.
Figure 3:
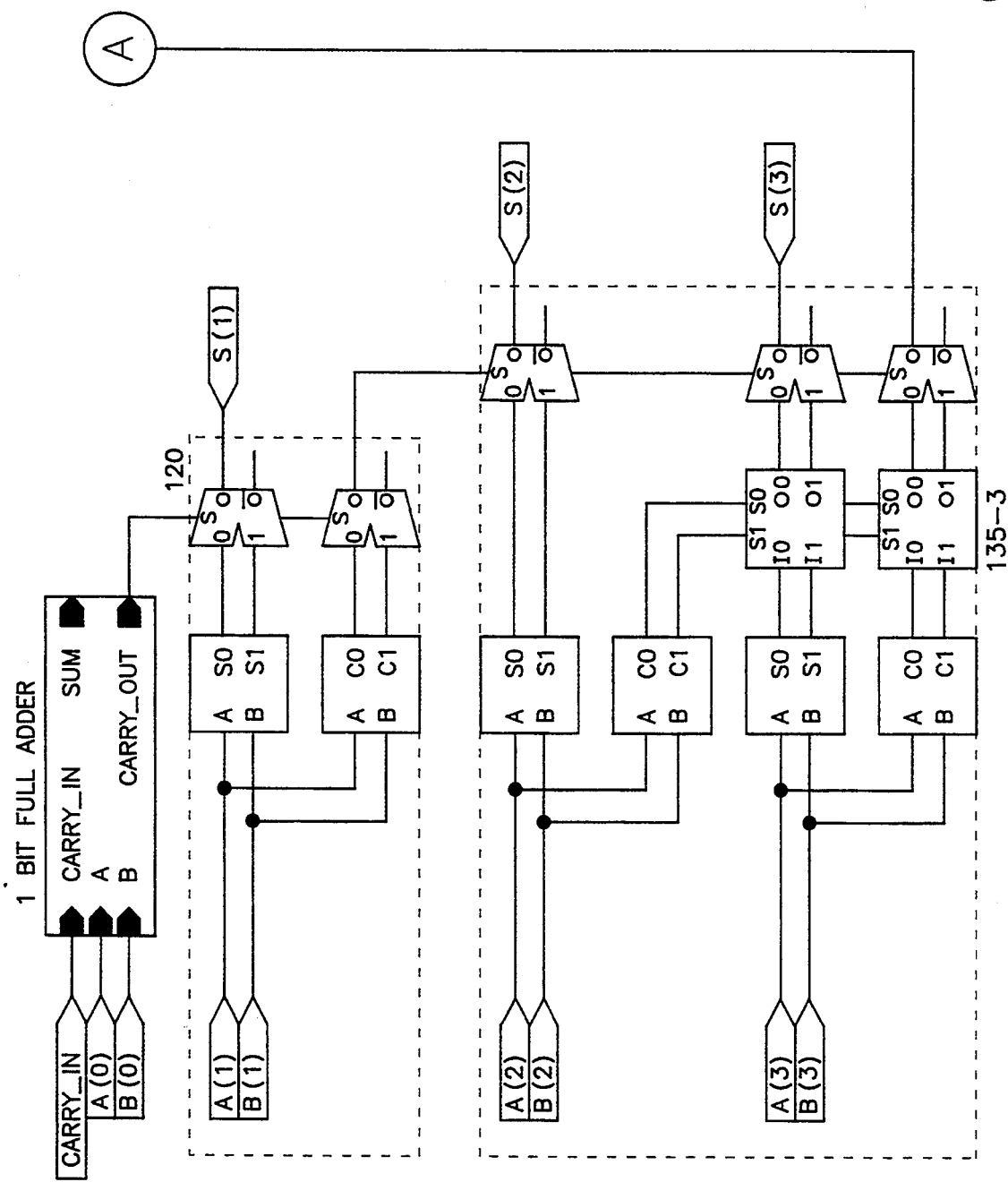
FIG. 3 shows a simplified structural block diagram showing only the portion of carry-operations for the carry select adder of FIG. 2 in adding two sixteen-bit numbers.
Figure 4:
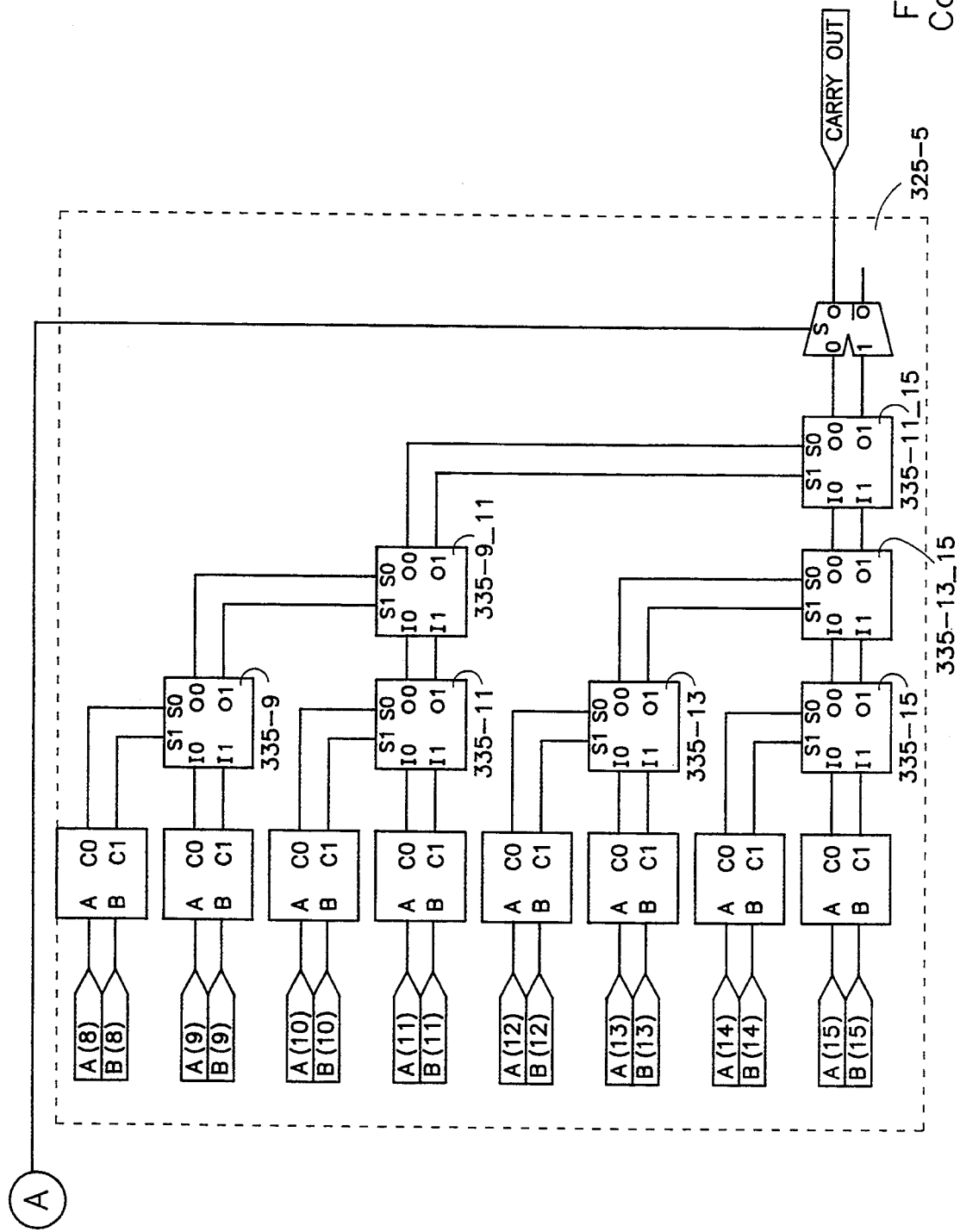
FIG. 4 shows the portion of carry-operations for a binary carry select adder in adding two sixteen-bit numbers according to the present invention.

FIG. 4 shows a binary select adder 300 showing only the portion of carry-operations according to the present invention. The adder 300 is used for processing the addition of two numbers up to sixteen bits. The same structure and process flow however can be used for higher number of bits. Similar to FIG. 3, the adder 300 comprises many adder cells, i.e., 325-1, 325-2, 325-3, etc. A series of fourplex processing means 335 are used to process two bits simultaneously utilizing the process as described for FIGS. 2 and 3.

The adder 300 is structured differently than the prior art adder 120 by utilizing the fourplex processing means 335 for every two bits starting from bit-2. Thus the adder cell 325-4 processes bits 4, 5 and bits 6, 7 in parallel by the use of two fourplex processing means 335-5 and 335-7. Based on the same principle, the adder cell 325-5 processes bit-8 to bit-15 by the use of four fourplex processing means 335-9, 335-11, 335-13, and 335-15. Thus adder cell 325-5 processes bit-pairs 8-9, 10-11, 12-13, and 14-15 are in parallel. Next level of multiplexing are then performed by the use of more fourplex processing means 335-57, 335-911, 335-1315, and then the next level of the fourplex means 335-1115 is used for further processing before the carry from last adder cell 325-4 is used to compute the sums and the 'carrys' for adder cell 325-5.

The present invention allows more parallel processing in the time when the carry of last adder cell is yet to be received. It takes advantage of the modern IC processing technology which allows the adding of more multiplexing circuits as that shown in FIG. 4 without undue expansion of areas occupied by the circuits. With the submicron technology, the constraint on fan-out loading of an adder is also greatly reduced.

Figure 5:
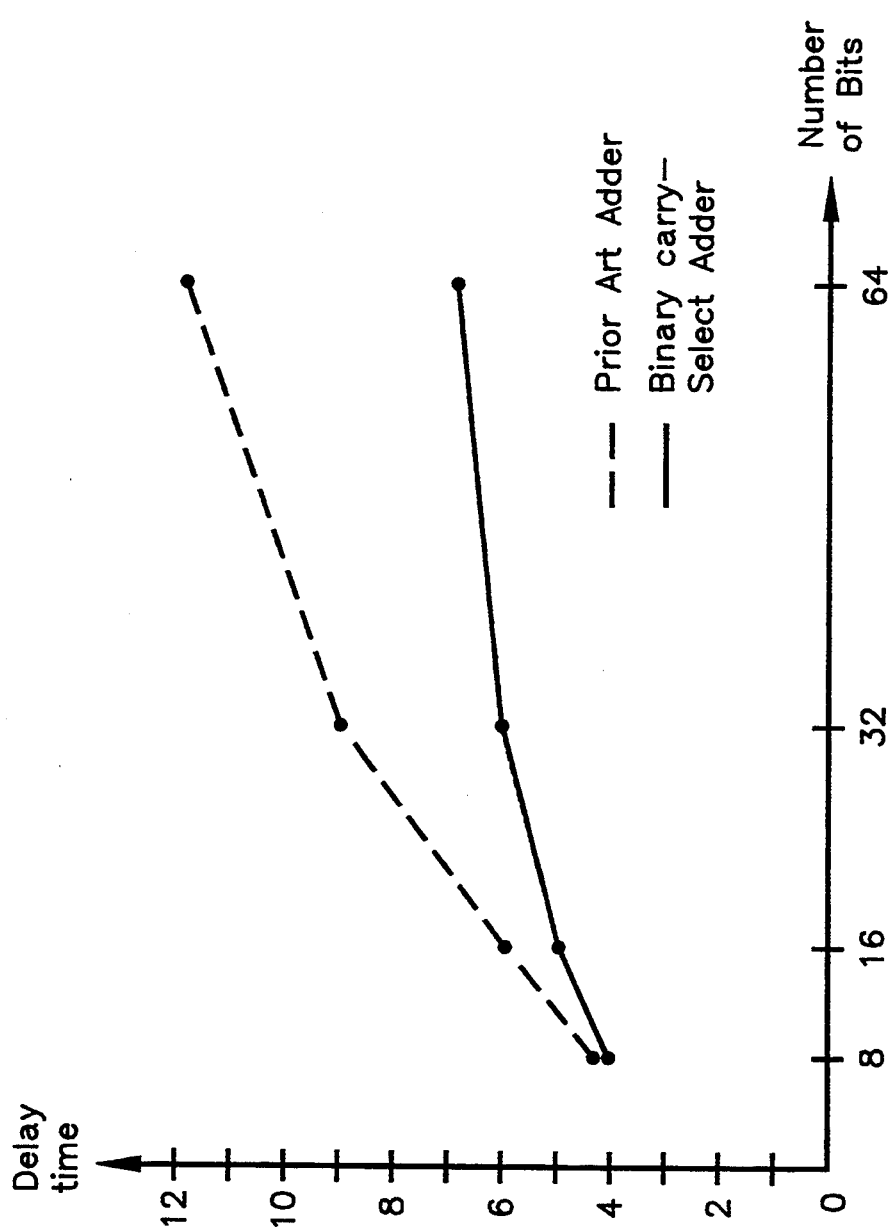
FIG. 5 shows two curves to compare the processing delays in waiting for the carry-ins in a prior art adder and an adder of the present invention.

Because of the structural differences between the binary carry select adder 300 of the present invention and that of the prior art, substantial saving of processing time is achieved. For adding two sixteen-bit numbers, the binary carry select adder 300 requires only six adder cells and there are seven delays in waiting for the carryin from the adder cells for processing less significant bits. In contrast, for adding two sixteen-bit numbers, the prior art adder 120 requires nine adder cells and needs ten carryin delays. More than twenty percent saving of processing time is achieved by the sixteen bit adder 300. The time saving is greater when the number of bits to be processed is increased. In comparison to the conventional adder 120, the time delay of a binary carry select adder which is structured like adder 300 is estimated to be:

$$T\alpha[\log_2 N + 1] \qquad (2)$$

Where N is the number of bits for the numbers to be added. FIG. 5 is a plot of the estimated processing time T as computed in equations (1) and (2) as a function of the number of bits for the operands to be added. More significant processing time saving is achieved by the present invention when the number of bits increased. With expanded data buses to transmit sixteen, thirty-two and even sixty-four number of bits, the adder as taught in the present invention therefore has significant advantage over that of the prior art for implementation in the modern high speed computers and processors.

Figure 6:
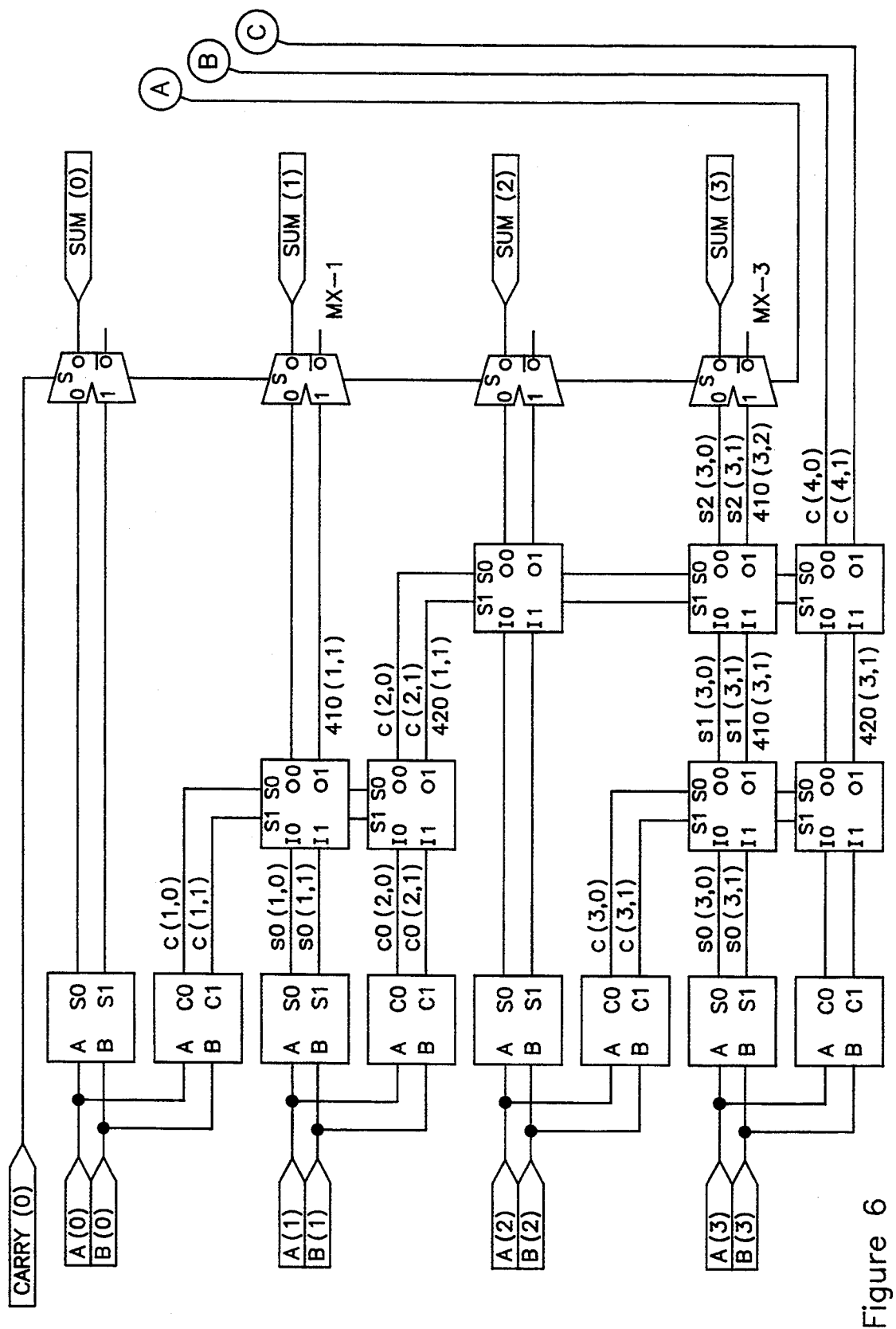
FIG. 6 shows a binary carry select adder for adding two eight-bit numbers according to the present invention.
Figure 6:
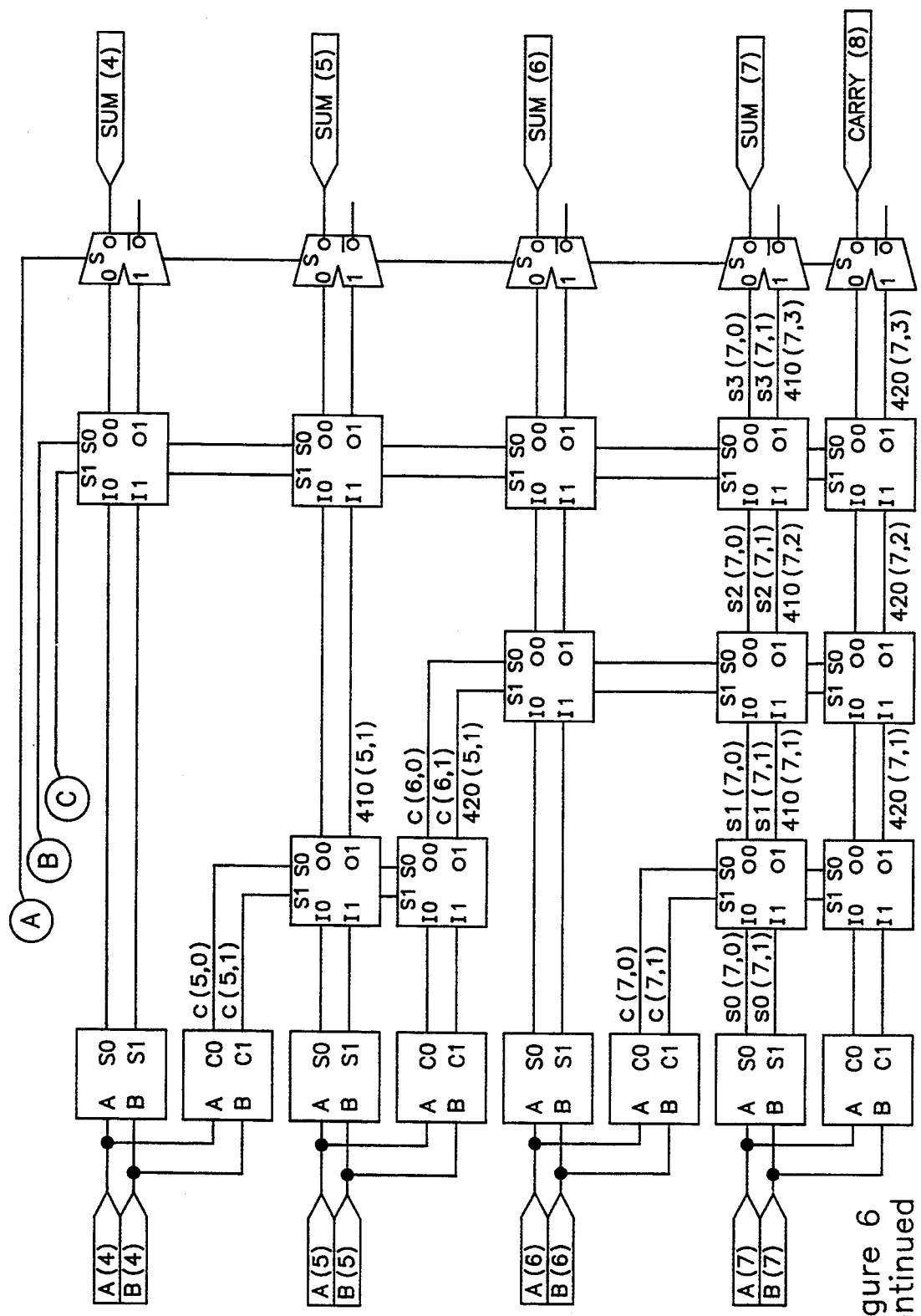

In actual implementation, the computations are carried out by performing two separated and parallel operations, i.e., the sum operation and a carry operation. FIG. 6 shows, in more details, an alternative preferred embodiment of the present invention of an adder 400 for processing the addition of two eight-bit numbers, i.e., $a_0 a_1 a_2 \ldots a_7$ and $b_0 b_1 b_2 \ldots b_7$. The operation of the adder 400 proceeds from the left to the right by utilizing a plurality of fourplex sum processing means 410 and a corresponding fourplex carry processing means 420.

Starting at time step zero, for the processing of A(0) and B(0), the operation to obtain the sum is simply to add A(0) to B(0) and taking into consideration of CARRY(0) to determine the value of SUM(O). Meanwhile, two separate preselected 'carrys', i.e., C(1,0), and C(1,1) for A(0)+B(0) assuming that the CARRY(0) is zero and one respectively are computed. During time step zero, all the initial sums, i.e., $S_0(i,0)$ and $S_0(i,1)$ and the initial 'carrys', i.e., $C_0(i,0)$ and $C_0(i,1)$ where i=2 to 7 for bit one to bit 7 are computed. The computation now proceeds to time step one. There are a plurality of fourplex sum processing means 410(i,j) where i is the bit number and j is the time step, and a plurality of fourplex carry processing means 420(i,j), where again, i is the bit number and j is the time step, wherein each fourplex processing means, i.e., 410(i,j) and 420(i,j), receives four input from its two input terminals, i.e., $I_0$, $I_1$, and two select terminals, i.e., $S_0$, $S_1$. Each fourplex processing means, i.e., 410(i,j) and 420(i,j), generates corresponding outputs via the output terminals, i.e., $O_0$ and $O_1$. Table 2 shows the truth table of the fourplex processing means 410(i,j) and 420(i,j).

TABLE 2

| TRUTH TABLE FOR FOURPLEX PROCESSING MEANS | | | |
|---|---|---|---|
| $S_0$ | $S_1$ | $O_0$ | $O_1$ |
| 0 | 0 | $I_0$ | $I_0$ |
| 0 | 1 | $I_0$ | $I_1$ |
| 1 | 1 | $I_1$ | $I_1$ |

The value of the output terminals, i.e., $O_0$ and $0_1$, depends on the combination of the values on the select terminals $S_0$ and $S_1$. When the values of $S_0$ and $S1$ are both zero or one, the values of $I_0$ and $I1$ are both either zero or one respectively. When $S_0=0$ and $S_1=1$, there are two resulting output values, i.e., $S_0=I_0$ and $S_1=I_1$, and the value of the carryin from the preceding processing unit for the less significant bits dictates the selection between these two values. i.e., $I_0$ and $I_1$.

In time step one, the fourplex sum processing means 410(1,1), 410(3,1), 410(5,1), and 410(7,1) and the fourplex carry processing means 420(1,1), 420(3,1), 420(5,1), and 420(7,1) each receives four input data in parallel. In time step one, eight fourplex processing means process thirty two input data simultaneously. Saving of processing time is achieved because of the structure allows more parallel processing. For example, in time step one, the fourplex sum processing means 410(i,1) receives C(i,0) and C(i,1) on terminal $S_0$ and $S_1$ respectively and $S_0(i,0)$ and $S_0(i,1)$ on terminal $I_0$ and $I_1$ respectfully, meanwhile, the fourplex carry processing means 420(i,1) receives C(i,0) and C(i,1) on terminal $S_0$ and $S_1$ respectively and $C_0(i,0)$ and $C_1(i,1)$ on terminal $I_0$ and $I_1$ respectfully where i=1, 3, 5, and 7. Because these data are simultaneously received by eight fourplex processing means, i.e., 410(i,1) and 420 (i,1) where i=1, 3, 5, and 7, the time delay spent in waiting for the carry parameters in the prior art adder are eliminated. The same principle applied to the other fourplex processing means in subsequent time steps, i.e., time steps 2, 3, and 4.

The final value of SUM(l) has to take into consideration of CARRY(0) and C(1,0) and C(1,1). Therefore, the fourplex processing means 410(1,1) uses C(1,0) and C(1,1) as selecting input and the multiplexer MX-1 applies CARRY(0) for the determination of the SUM(1). For the computation of SUM(3), the input value of CARRY(0), and C(1,0), C(1,1), $C_0(2,0)$, $C_0(2,1)$ and C(3,0) and C(3,1). Meanwhile, since C(2,0) and C(2,1)

are the obtained by taking into account of C(1,0) and C(1,1), and $C_0(2,0)$ and $C_0(2,1)$, C(2,0) and C(2,1) can be used for the computation of SUM(3) in the fourplex processing means 410(3,2). Consequently, $S_0(3,0)$ and $S_0(3,1)$ are processed by the fourplex processing means 410(3,1) using C(3,0) and C(3,1) on its selecting terminals to generate $S_1(3,0)$ and $S_1(3,1)$ which are further processed by the fourplex processing means 410(3,2) applying C(2,0) and C(2,1) on its selecting terminals for the determination of $S_2(3,0)$ and $S_2(3,1)$. CARRY(0) is then used by MX(3) to compute SUM(3). On the same principle, the determination of SUM(7) is processed by the following sequence:

1. Compute $S_0(7,0)$ and $S_0(7,1)$ by the use of the carry select full adders;
2. Compute $S_1(7,0)$ and $S_1(7,1)$ by the use of the fourplex processing means 410(7,1) and by applying C(7,0) and C(7,1) as selecting input to 410(7,1);
3. Compute $S_2(7,0)$ and $S_2(7,1)$ by the use of the fourplex processing means 410(7,2) and by applying C(6,,0), C(6,1), C(5,0) and C(5,1) to 410(7,2);
4. Compute $S_3(7,0)$ and $S_3(7,1)$ by the use of the fourplex processing means 410(7,3) and by applying C(4,,0), C(4,1), C(3,0), C(3,1), C(2,,0), C(2,1), C(1,0), and C(1,1) to 410(7,3); and
5. Compute SUM(7) by the use of the multiplexing means MX-7 taking into consideration of CARRY(0).

A binary pattern is thus developed where the computation of the output intermediate preselect sums in time step K, i.e., $S_K(i,0)$ and $S_K(i,1)$, where the i represent the bit number and the k represents the time step are carried out by taking into account the carry-ins of the previous bits starting from the i-th bit. The time delays in waiting for the carry-ins from the processing of the previous less significant bits are thus greatly reduced.

This binary structure can be more specifically described as the followings. A binary carry select adder for adding two numbers of N binary bits wherein for each of the N bits, the carry select adder includes a sum processing means for generating a first sum assuming a carryin of zero and a second sum assuming a carryin of one. And, for each of the N bits, the binary carry select adder includes a carry processing means for generating a first carry assuming a carryin of zero and a second carry assuming a carryin of one. The binary carry select adder can be conceptually divided into K adder cells where $N=2^K+R$ and K is an integer whereas R is an integer remainder and $0 \leq R < (2^{K+1}-2^K)$. Except the sum processing means of the first bit, i.e., bit-0 which is directly connected to a multiplex processing means, all the sum processing means are connected, through at least one fourplex processing means, to a multiplex means which receives a carry input from one-less significant bit for computing a final sum output for that bit.

The binary carry select adder is then structured by providing, for all the even number of bits, i.e., the $j*2^m$-th bit where j is an odd-integer, m=1,2,3, . . . ,K and $j*2^m \leq (2^K+R)$, a series of m pairs of interconnected fourplex processing means, where m is set to one if j is greater than one and one fourplex processing means for each pair connected in series to the sum processing means and one connected in series to the carry processing means. For j=1, referring to FIG. 6, there are three pairs of fourplex processing means for bit-7 which is the eighth-bit, i.e., the $2^m$th-bit where m=3, and these three pairs are fourplex processing means 410(7,1), 420(7,1), 410(7,2), 420(7,2), 410(7,3) and 420(7,3). And, there are two pairs for bit-3 which is the fourth bit, i.e., the $2^m$-th bit where m=2, and these two pairs are fourplex processing means 410(3,1), 420(3,1), 410(3,2), and 420(3,2). Similarly, there is one pair for bit-1, i.e., the $2^m$-th bit where m=1 and this pair is 410(1,1) and 420(1,1). The first pair of these fourplex processing means connected directly to their own sum and carry processing means and also connected to the carry processing means for the $(j*2^m-1)$th bit. For j=1, i.e., the last bit of every m-th adder cell, each of the last fourplex processing means connecting in series to the sum processing means, i.e., 410(7,3), 410(3,2), and 410(1,1), are then connected to the multiplexing means for computing the final sums taking into consideration of the carry from the $(2^m-1)$th bit.

The binary carry select adder is further structured by providing, for all the sum processing means of the first bit of each m-th adder cell, i.e., $(2^{(m-1)}+1)$th bit where m=1,2,3, . . K, one fourplex processing means which receives a carry input data from the fourplex processing means for the last bit of the last adder cell, i.e., $(2^{m-1})$th bit. This fourplex processing means is then connected to the multiplex processing means for computing the final sum for the $(2^{(m-1)}+1)$th bit taking into account the carryin from the $2^{(m-1)}$th bit. Referring to FIG. 6, single fourplex processing means 410(3,2) which receives input $S_0(2,0)$ and $S_0(2,1)$ and C(2,0) and C(2,1) to generate an input to multiplexing means MX-2. Similarly, single fourplex processing means 410(5,3) which receives input $S_0(4,0)$ and $S_0(4,1)$ and C(4,0) and C(4,1) to generate an input to multiplexing means MX-4.

Other than the last, i.e., the $2^m$-th, bit and the fist bit, i.e., $(2^{(m-1)}+1)$th bit of each adder cell, each of the sum processing means in each m-th adder cell is connected in series with (m−1) fourplex processing means before it is connected to the multiplex processing means for the computation of a final sum. For an even bit, i.e., $j*2^m$-th bit where j is not one, the first fourplex processing means is a paired fourplex processing means described above, and the second and on fourplex processing means are connected in series to the last fourplex processing means of this bit and to a fourplex processing means receiving a set of carryin data from the $(j*2^m-1)$th bit. Referring to FIG. 6, the fourplex processing means for the sixth-bit, the $3*2^1$-th bit, i.e., fourplex processing means 410(5,1) receives input from the sum processing means of the sixth bit and C(5,0) and C(5,1). The fourplex processing means for the sixth-bit, the $3*2^1$-th bit, i.e., fourplex processing means 410(5,3) receives input from the fourplex processing means 410(5,1) of the sixth bit and C(5,0) and C(5,1) form the fourplex processing means 410(4,3) to generate input to the multiplex means MX-5.

For an odd bit in an adder cell m, i.e., $(j*2^{(m-1)}-1)$th bit, the first fourplex processing means is a fourplex processing means connected directly to the sum processing means of this bit as described above, and the second and on fourplex processing means are connected in series to the last fourplex processing means of this bit and also to a fourplex processing means receiving a set of carryin data from the $(j*2^{(m-1)}-2)$th bit.

Finally, a last fourplex processing means for processing the last bit of the N bits which being connected in series with the carry processing means of the N-th bit is connected further to a last multiplex processing means for generating a carry output for the binary carry select adder.

The structure of a binary carry select adder according to the present invention can be applied to the addition of two numbers where the full adder can process a plurality of bits. The application of this binary select adder is not limited to the use of full adders for processing single bit only. Saving of processing time can be achieved as well by utilizing the similar structure which provides more parallel processing while waiting for the carryin value from the less significant stage of the adder to be processed. The rippling effect which is the major cause of time delay of an adder is reduced whereby the improved high speed adder can be made available for the modern data processor by use of the structure as disclosed in this invention.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A binary carry select adder for adding two numbers of N binary bits. where $N=2^K+R$ and K is an integer whereas R is an integer remainder and $0 \leq R < (2^{K+1}-2^K)$, comprising:
   a plurality of pairs of full adders for adding one bit of said two numbers wherein each of said pairs of full adders including a first adder for processing an initial sum and carry assuming a carry select of zero and a second adder for processing an initial sum and carry assuming a carry select of one, said plurality of pairs of full adders being further organized into (K+1) adder cells wherein each adder cell including $2^n$ pairs of adders for n=0, 1, 2, ... , K, and R pairs of adders for the (K+1)th adder cell;
   each of said adder cells further including a plurality of fourplex processing means which being organized into a first stage and a plurality of subsequent stages wherein each of said fourplex processing means in said first stage being connected to two of said pairs of adders whereas each of said fourplex processing means of said subsequent stages being connected to two of said fourplex processing means for receiving four input data and generating a pair of appropriate sums and intermediate carrys;
   a plurality of multiplex processing means receiving input from a pair of full adders or a fourplex processing means, each of said multiplex processing means further receiving a carry from said multiplex processing means of one-less significant bit for generating a final sum output for each bit and a final carry output for a N-th bit; and
   said inter-connected pairs of full adders, fourplex processing means and multiplex processing means forming (K+1) adder cells wherein each cell processing $2^m$ bits (where m=1,2,..,K) of said N bits for generating a sum output for each bit and a carry for input to a next adder cell whereas the last adder cell processing last R bits of said N bits.

2. The binary carry select adder of claim 1 wherein:
   each of said fourplex processing means receives four input via two input terminals, i.e., $I_0$, $I_1$, and two select terminals, i.e., $S_0$, $S_1$ to generate two output via two output terminals, i.e., $O_0$ and $O_1$ in accordance with a truth table as Table 2 set forth below:

TABLE 2
TRUTH TABLE FOR FOURPLEX PROCESSING MEANS

| $S_0$ | $S_1$ | $O_0$ | $O_1$ |
|---|---|---|---|
| 0 | 0 | $I_0$ | $I_0$ |
| 0 | 1 | $I_0$ | $I_1$ |
| 1 | 1 | $I_1$ | $I_1$ |

3. A binary carry select adder for adding two numbers of N binary bits. where $N=2^K+R$ and K is an integer whereas R is an integer remainder and $0 \leq R < (2^{K+1}-2^K)$, comprising:
   a sum processing means for each of said N bits for generating a first sum assuming a carryin of zero and a second sum assuming a carryin of one;
   a carry processing means for each of said N bits, connected to said sum processing means, for generating a first carry assuming a carryin of zero and a second carry assuming a carryin of one;
   at least one fourplex processing means for each of said N bits except the first bit, connected to said sum processing means and said carry processing means;
   a multiplex processing means for each of said N bits connected to said sum processing means via said fourplex processing means for receiving a carry input from a one-less significant bit for computing a final sum output for said bit;
   said inter-connected sum processing means, carry processing means, fourplex processing means and multiplex processing means forming (K+1) adder cells wherein each cell processing $2^m$ bits (where m=1,2,..,K) of said N bits for generating a sum output for each bit and a carry for input to a next adder cell whereas the last adder cell processing last R bits of said N bits; and
   a last multiplex processing means connected to said carry processing means via said fourplex processing means for the N-th bit of said N bits for generating a carry output for said binary carry select adder.

4. The binary carry select adder of claim 3 wherein:
   each of said fourplex processing means receives four input from two input terminals, i.e., $I_0$, $I_1$, and two select terminals, i.e., $S_0$, $S_1$ to generate two output via two output terminals, i.e., $O_0$ and $O_1$ in accordance with a truth table as Table 2 set forth below:

TABLE 2
TRUTH TABLE FOR FOURPLEX PROCESSING MEANS

| $S_0$ | $S_1$ | $O_0$ | $O_1$ |
|---|---|---|---|
| 0 | 0 | $I_0$ | $I_0$ |
| 0 | 1 | $I_0$ | $I_1$ |
| 1 | 1 | $I_1$ | $I_1$ |

5. A binary carry select adder for adding two numbers of N binary bits. where $N=2^K+R$ and K is an integer whereas R is an integer remainder and $0 \leq R < (2^{K+1}-2^K)$, comprising:
   a sum processing means for each of said N bits for generating a first sum assuming a carryin of zero and a second sum assuming a carryin of one;
   a carry processing means for each of said N bits, connected to said sum processing means, for generating a first carry assuming a carryin of zero and a second carry assuming a carryin of one;

at least one fourplex processing means for each of said N bits except the first bit of said N bits, connecting to said sum processing means and said carry processing means;

a multiplex processing means for each of said N bits connected to said sum processing means via said fourplex processing means, except said sum processing means for the first bit of said N bits connected directly to said multiplex processing means, said multiplex processing means receiving a carry input from a one-less significant bit for computing a final sum output for said bit;

said inter-connected sum processing means, carry processing means, fourplex processing means and multiplex processing means forming (K+1) adder cells wherein each cell processing $2^m$ bits of said N bits where m=1,2,...,K whereas the last adder cell processing last R bits of said N bits;

for all the even number of bits, i.e., the $j*2^m$-th bit where j being an odd-integer, m=1,2,3,...,K and $j*2^m \leq (2^K+R)$, said fourplex processing means forming a series of inter-connected m pairs of fourplex processing means where m being set to one if j being three or greater, one of said fourplex processing means connected to said sum processing means and one connected to said carry processing means, furthermore, each of the last fourplex processing means for the last bit which being a $2^m$-th bit for each of said adder cell being connected to said multiplexing means for computing said final sum output;

for the first bit of each of said m-th adder cell which being $(2^{(m-1)}1)$th bit where m=1,2,3,..K, said sum processing means being connected to one fourplex processing means which receiving a carry input data from said fourplex processing means for the last bit of a last adder cell, i.e., $(2^{m-1})$th bit, said fourplex processing means for said first bit being further connected to said multiplex processing means for computing said final sum output;

each of said sum processing means, other than said first and last bits in each of said m-th adder cell, being connected in series with m of said fourplex processing means before being connected to said multiplex processing means wherein for each of said even bit, i.e., $j*2^m$-th bit where j being not one, said first fourplex processing means being one of said paired fourplex processing means where m>2 for said fourplex processing means connected in series to a last fourplex processing means wherein each of said fourplex processing means receiving a set of carryin data from the $(j*2^m-1)$th bit while for an odd bit, i.e., $(j*2^m-1)$th bit, said first fourplex processing means connected directly to said sum processing means where m>2 for said fourplex processing means connected in series to a last fourplex processing means while receiving a set of carryin data from a $(j*2^m-2)$th bit; and a last fourplex processing means for processing the N-th bit of said N bits which being connected in series with said carry processing means of the N-th bit being connected further to a last multiplex processing means for generating a carry output for said binary carry select adder.

6. The binary carry select adder of claim 5 wherein:
each of said fourplex processing means receives four input from two input terminals, i.e., $I_0$, $I_1$, and two select terminals, i.e., $S_0$, $S_1$ to generate two output via two output terminals, i.e., $O_0$ and $O_1$ in accordance with a truth table as Table 2 set forth below:

TABLE 2

TRUTH TABLE FOR FOURPLEX PROCESSING MEANS

| $S_0$ | $S_1$ | $O_0$ | $O_1$ |
|---|---|---|---|
| 0 | 0 | $I_0$ | $I_0$ |
| 0 | 1 | $I_0$ | $I_1$ |
| 1 | 1 | $I_1$ | $I_1$ |

7. A data-processing system comprising:
a binary carry select adder for adding two numbers of N binary bits. where $N=2^K+R$ and K is an integer whereas R is an integer remainder and $0 \leq R < (2^{K+1}-2^K)$;

a plurality of pairs of full adders for adding one bit of said two numbers wherein each of said pairs of full adders including a first adder for processing an initial sum and carry assuming a carry select of zero and a second adder for processing an initial sum and carry assuming a carry select of one, said plurality of pairs of full adders being further organized into (K+1) adder cells wherein each adder cell including $2^n$ pairs of adders for n=0, 1, 2, ..., K, and R pairs of adders for the (K+1)th adder cell;

each of said adder cells further including a plurality of fourplex processing means which being organized into a first stage and a plurality of subsequent stages wherein each of said fourplex processing means in said first stage being connected to two of said pairs of adders whereas each of said fourplex processing means of said subsequent stages being connected to two of said fourplex processing means for receiving four input data and generating a pair of appropriate sums and intermediate carrys;

a plurality of multiplex processing means receiving input from a pair of full adders or a fourplex processing means, each of said multiplex processing means further receiving a carry from said multiplex processing means of one-less significant bit for generating a final sum output for each bit and a final carry output for a N-th bit; and said inter-connected pairs of full adders, fourplex processing means and multiplex processing means forming (K+1) adder cells wherein each cell processing $2^m$ bits (where m=1,2,..,K) of said N bits for generating a sum output for each bit and a carry for input to a next adder cell whereas the last adder cell processing last R bits of said N bits.

8. The binary carry select adder of claim 7 wherein:
each of said fourplex processing means receives four input from two input terminals, i.e., $I_0$, $I_1$, and two select terminals, i.e., $S_0$, $S_1$ to generate two output via two output terminals, i.e., $O_0$ and $O_1$ in accordance with a truth table as Table 2 set forth below:

TABLE 2

TRUTH TABLE FOR FOURPLEX PROCESSING MEANS

| $S_0$ | $S_1$ | $O_0$ | $O_1$ |
|---|---|---|---|
| 0 | 0 | $I_0$ | $I_0$ |
| 0 | 1 | $I_0$ | $I_1$ |
| 1 | 1 | $I_1$ | $I_1$ |

* * * * *